United States Patent
Koizumi et al.

(10) Patent No.: US 6,501,728 B2
(45) Date of Patent: Dec. 31, 2002

(54) OPTICAL DISC HAVING GROOVE AND LAND TRACKS

(75) Inventors: Takeshi Koizumi, Miyagi (JP); Norio Adachi, Miyagi (JP); Hiroyuki Sakai, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/838,515

(22) Filed: Apr. 19, 2001

(65) Prior Publication Data

US 2002/0054564 A1 May 9, 2002

(30) Foreign Application Priority Data

| Apr. 21, 2000 | (JP) | 2000-121336 |
| May 30, 2000 | (JP) | 2000-160765 |
| May 30, 2000 | (JP) | 2000-160766 |
| Jul. 7, 2000 | (JP) | 2000-206988 |
| Jul. 28, 2000 | (JP) | 2000-229605 |

(51) Int. Cl.$^7$ ............................................. G11B 7/24
(52) U.S. Cl. ................... 369/275.4; 369/13.55; 428/64.4
(58) Field of Search .................. 369/275.4, 13.55, 369/275.2, 275.3, 277, 278, 279; 428/64.1, 64.4, 64.3

(56) References Cited

U.S. PATENT DOCUMENTS

| 4,931,336 A | * | 6/1990 | Haneda | 369/275.4 |
| 5,430,706 A | * | 7/1995 | Utsunomiya et al. | 369/275.4 |
| 6,086,993 A | | 7/2000 | Yoshinari et al. | 428/336 |
| 6,108,297 A | * | 8/2000 | Ohta et al. | 369/275.4 |
| 6,292,458 B1 | * | 9/2001 | Eguchi et al. | 369/275.4 |

* cited by examiner

*Primary Examiner*—Tan Dinh
(74) *Attorney, Agent, or Firm*—Sonnenschein, Nath & Rosenthal

(57) ABSTRACT

An over-writable magneto-optical recording medium in which a recording section has at least a first dielectric layer, a first recording layer, a second recording layer, and a second dielectric layer formed sequentially and a reflective layer and a protective layer formed on the recording section. A groove is formed on the transparent substrate along a recording track, both sidewalls of the groove are formed into an independent wobbling shape, a relationship of $0.470 \leq W/\emptyset \leq 0.610$ is effectuated where the width of the groove as W, and a relationship of $0.120 \leq D(\lambda/n) \leq 0.142$ is effectuated where the depth of the groove as D, and the angle $\emptyset$ between wall faces of the groove is $150° \pm 10$. a relationship of $0.55 \leq (d_2/d_1) \leq 0.9$ is effectuated when assuming the thickness of the first dielectric is $d_1$ and the reflective layer is $d_2$.

13 Claims, 5 Drawing Sheets

10

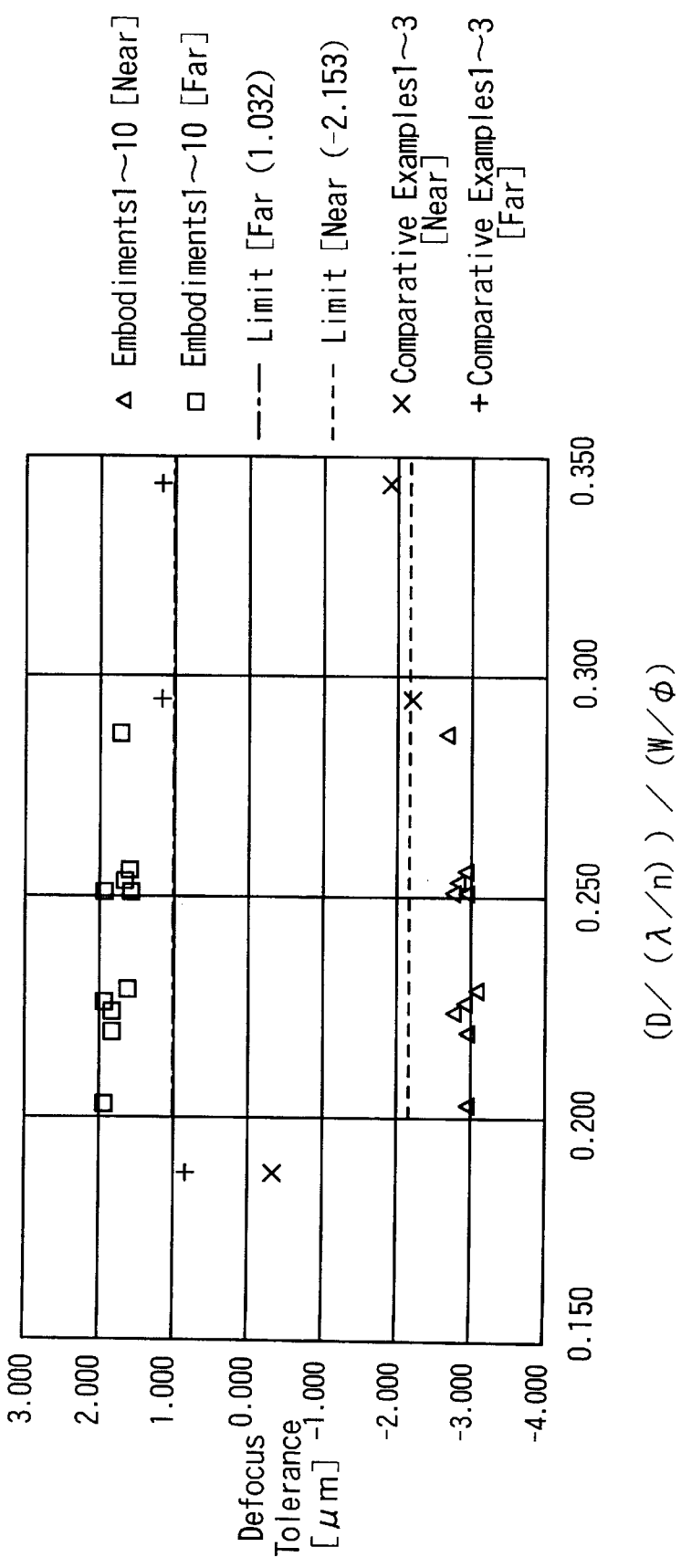

OPTICAL DISC HAVING GROOVE AND LAND TRACKS

RELATED APPLICATION DATA

The present application claims priority to Japanese Applications Nos. P2000-121336 filed Apr. 21, 2000, P2000-260765 filed May 30, 2000, P2000-160766 filed May 30, 2000, P2000-206988 filed Jul. 7, 2000 and P2000-229605 filed Jul. 28, 2000, which applications are incorporated herein by reference to the extent permitted by law.

BACKGROUND OF THE INVENTION

The present invention relates to a magneto-optical recording medium.

An optical recording medium is a recording medium in which a laser beam is applied to a signal-recording layer by a recording/reproducing apparatus to record and/or reproducing a record signal.

The following are known as optical recording media: a reproducing-dedicated digital audio disk (so called compact disk), an optical video disk (so called laser disk), a magneto-optical disk, and a phase-change-type optical disk.

As an example of the above optical recording media, a magneto-optical recording medium is used, having a multilayer structure in which a first dielectric layer a signal-recording layer, a second dielectric layer, and a metallic reflective layer are formed in order on a transparent substrate made of, for example, polycarbonate.

In the case of the above optical recording medium, a signal is recorded on or reproduced from a signal-recording layer along a recording track, and a groove is formed on a transparent substrate along the recording track, and it is requested to realize a recording medium having a larger capacity by improving the recording density.

For example, an MD (minidisk) which is one of standards of magneto-optical recording media has a configuration which has an easily-magnetized axis in the vertical direction to a substrate surface and in which a magnetic recording layer made of a magnetic film having a large magneto-optical effect is formed, the recording layer, a metallic reflective layer and a dielectric layer are laminated so that a recording section having a laminated structure on a transparent substrate is formed, and a protective layer made of, for example, an ultraviolet-curing resin is laminated on the recording section.

This minidisk is marketed as a re-writable magneto-optical recording medium and a magnetic-field-modulating magneto-optical recording medium in which a user can repeatedly record and erase information.

The following types are realized as the above minidisk (MD): a minidisk in which the pitch between recording tracks is set to 1.6 ($\mu$m) to allow music signals to be recorded for 60 or 74 (min) and a minidisk in which the pitch between recording tracks is narrower to set to 1.5 ($\mu$m) and thereby, the recording density is improved to allow music signals to be recorded for 80 (min).

Moreover, because a magneto-optical recording medium such as a (MD) minidisk can be used for various cases from home use to use by mounting the recording medium on a car because it is possible to easily record music in the recording medium serving as a household recording unit.

As described above, to accelerate general use of the above minidisk, it is indispensable to downsize an apparatus for recording or reproducing information in or from a magneto-optical recording medium and reduce the power consumption of the apparatus.

Particularly, in the case of a magneto-optical recording medium using a magnetic-field modulating system, it is necessary to modulate an applied magnetic field at a high speed. Therefore, it is necessary to make a magnetic head greatly approach a magneto-optical recording medium by decreasing the distance between the magnetic head and the corresponding face of the recording medium.

As recording systems for the above magnetic-field-modulating magneto-optical recording medium, it is proposed to use various types of fixed heads such as a sliding system and a flying head system.

However, as described above, when narrowing the pitch between recording tracks in order to increase a storage capacity, a problem occurs that a tolerance to a shift of the focus of a laser beam (hereafter referred to as defocus tolerance) to be irradiated for recording or reproducing data is decreased.

Thus, the decrease of the defocus tolerance causes the crosstalk for recording or reproducing data. Moreover, a difference occurs between optical characteristics of optical pickups due to the intrinsic performance of respective various types of recording and reproducing apparatuses. Thus, a problem occurs that a stable C/N characteristic cannot be obtained because a preferable reproduced signal is obtained from a recording/reproducing apparatus but a jitter value (time-axis fluctuation value) increases and an error rate deteriorates in another reproducing apparatus.

SUMMARY OF THE INVENTION

To solve the above problems, in the case of a magneto-optical recording medium such as a minidisk for repeatedly recording and reproducing information, a signal characteristic is improved by the so-called enhanced effect capable of enhancing an apparent Kerr rotational angle by adjusting the thickness of a dielectric film having a refractive index higher than that of a transparent substrate and obtaining effects of multiple reflection and interference so that a laser beam accurately traces a recording layer forming a magneto-optical medium.

However, also in the above description, it is difficult to obtain a signal characteristic enough for practical use in accordance with various types of reproducing apparatuses.

Therefore, as a result of earnestly repeating studies, the present inventor et al. provide an over-writable magneto-optical recording medium from which a superior signal characteristic and a high durability are obtained by sufficiently securing the defocus tolerance of a laser beam to be irradiated, improving the jitter characteristic, magnifying a power margin and thereby improving the C/N characteristic, and holding the surface strength of a disk even if a track pitch is narrowed.

An optical recording medium of the present invention has a configuration in which a recording section constituted of at least a first dielectric layer, a first recording layer, a second recording layer, and a second dielectric layer is sequentially formed, and a reflective layer and a protective layer are formed on the recording section.

In the case of an optical recording medium in which a groove is formed on the transparent substrate along a recording track and both sidewalls of the groove are respectively formed into an independent wobbling shape, the relation of $0.470 \leq W/\emptyset \leq 0.610$ is effectuated when assuming the width of the groove as W and the relation of $0.120 \leq D/(\lambda/n) \leq 0.142$ is effectuated when assuming the depth of the groove as D, and the angle θ between the wall faces of the groove is kept at 150° ±10°.

In this case, Ø denotes the spot diameter of a laser beam, λ denotes the wavelength of a laser beam in a vacuum state, and n denotes the refractive index of a transparent substrate.

Then, a refractive index in the in-plane direction is made to range between 140 and 25 (nm) and a double-refractive index in the vertical direction is made to range between 200 and 300 (nm).

Then, the first recording layer is made of Gd, Fe, and Co and contains 28 to 30 (at %) of Gd and the thickness of the layer is selected in a range of 50 to 100 Å, and the second recording layer is made of at least Tb, Fe, and Co, contains 22 to 24 (at %) of Tb and has a thickness of 180 to 250 Å.

Moreover, the relation of $0.55 \leq (d_2/d_1) \leq 0.9$ is effectuated when assuming the thickness of a first dielectric layer as $d_1$ and that of a reflective layer as $d_2$, and the reflective layer is made of Al, Au, and Ti and contains 20 to 40 (wt %) of Au and 0.5 to 2.0 (wt %) of Ti.

According to the present invention, also when narrowing the track pitch of a magnetic-field-modulating over-writable magneto-optical recording medium, a superior signal characteristic and a high durability can be obtained by sufficiently securing the defocus tolerance of a laser beam for recording or reproducing a signal, improving the jitter characteristic, magnifying a power margin and thereby improving the C/N characteristic, and holding the surface strength of a disk.

A magneto-optical recording medium of a first aspect of the present invention has a configuration in which a groove is formed on a transparent substrate made of, for example, polycarbonate along a recording track and both sidewalls of the groove are respectively formed into an independent wobbling shape. The relation of $0.470 \leq W/\emptyset \leq 0.610$ is effectuated when assuming the width of the groove as W, and the relation of $0.120 \leq D/(\lambda/n) \leq 0.142$ is effectuated when assuming the depth of the groove as D and the angle θ between the wall faces of the groove is kept at 150° ±10°.

(In this case, Ø denotes the spot diameter of a laser beam to be irradiated, λ denotes the wavelength of a laser beam in a vacuum state, and n denotes the refractive index of a transparent substrate.)

A magneto-optical recording medium is described below as an optical recording medium of the present invention by referring to the accompanying drawings. However, an optical recording medium of the present invention is not restricted to the example below.

That is, an optical recording medium of the present invention can be used as an optical recording medium for recording and/or reproducing data by using a laser beam as long as the recording medium has a configuration in which a groove is formed along a recording track and both sidewalls of the groove are respectively formed into a wobbling (zigzag) shape. For example, it can be used as an optical recording medium dedicated to reproducing in which a predetermined fine uneven pattern corresponding to a record signal is formed on a signal-recording layer, which can be used as one of various optical recording media such as a phase-change optical disk having a signal-recording layer made of a phase-change material.

FIG. 1 shows a schematic perspective view of an optical recording medium 10 of the present invention when a part of the medium 10 is cut out and FIG. 2 shows a schematic perspective view showing the layer structure of the optical recording medium 10.

The optical recording medium 10 of the present invention allows a record signal to be recorded or reproduced a plurality of times, which is accommodated in a disk cartridge (not illustrated) and removably used for a recording/reproducing apparatus (not illustrated).

As shown in FIG. 2, the magneto-optical recording medium 10 of the present invention has a configuration in which a first dielectric layer 3, a first recording layer 4, a second recording layer 5, a second dielectric layer 6, a reflective layer 7, and a protective layer 8 are sequentially laminated on a transparent substrate 2 made of a thermoplastic resin such as polycarbonate.

A signal is recorded in the optical recording medium 10 shown in FIGS. 1 and 2 by condensing a laser beam having a predetermined wavelength, e.g. 780 (nm) by an objective lens and applying the laser beam from the transparent-substrate-2-forming-face-2f side and applying a predetermined magnetic field by the recording magnetic head of a recording/reproducing apparatus.

In this case, the first recording layer 4 and second recording layer 5 of the optical recording medium 10 are raised in temperature by the laser beam and thereby decreased in coercive force. Therefore, a magnetic domain corresponding to a record signal is recorded in the second recording layer 5 by a magnetic field applied by a recording magnetic head.

Moreover, to reproduce the record signal recorded in the second recording layer 5, a laser beam is applied which has an output smaller than that of a laser beam for recording a signal. In this case, in the optical recording medium 10, return light of the laser beam reflected from the second recording layer 5 is polarized due to the magneto-optical effect such as the Kerr effect. The recording/reproducing apparatus detects the direction of a magnetic field of the magnetic domain recorded in the second recording layer 5 by detecting the polarized direction of the return light and thereby, reproduces a record signal.

The transparent substrate 2 is formed almost like a disk with a hard material capable of passing a laser beam. As the material for forming the transparent substrate 2, it is possible to use one of polycarbonate resin, acrylic resin, polyolefin resin, epoxy resin, and quartz glass.

Moreover, a groove 2b is spirally formed on the transparent substrate 2 in the circumferential direction. The optical recording medium 10 is constituted so that a signal is recorded or reproduced in or from the signal recording layer 4 along the groove 2b. That is, in the optical recording medium 10, a recording track is formed along the groove 2b.

Moreover, in the optical recording medium 10 of the present invention, a groove 2b is formed zigzag in the radius direction at a constant cycle and a small width as shown in FIG. 3. That is, both sidewalls 21 and 22 of a groove 2a are respectively formed into an independent wobbling (zigzag) shape.

The optical recording medium 10 is constituted so that the zigzag cycle of the groove 2b is read by a recording/reproducing apparatus when data is recorded or reproduced by a laser beam. Thereby, the recording/reproducing apparatus can always stably keep the rotational speed of the optical recording medium 10 in accordance with the groove 2b zigzagging at a constant cycle.

Moreover, the groove 2b is used as the criterion for positioning when recording or reproducing a record signal in or from the second recording layer 5 by a recording/reproducing apparatus and has a function for showing the recording position of a record signal, that is, the address of the signal in the optical recording medium 10. Thereby, the recording/reproducing apparatus can quickly perform accurate positioning when recording or reproducing data in or from the optical recording medium 10.

FIG. 4 shows a sectional view of a simplified layer structure of the optical recording medium 10 of the present invention. In this case, the first dielectric layer 3, second dielectric layer 6, and reflective layer 7 are omitted.

In the case of the optical recording medium 10 of the present invention, the relation of $0.470 \leq W/\emptyset \leq 0.610$ is effectuated when assuming the width of the groove 2a as W, the relation of $0.120 \leq D/(\lambda/n) \leq 0.142$ is effectuated when assuming the depth of the groove 2a as D, and the angle θ between wall faces of the groove 2a is kept at $150°\pm10°$.

In this case, $\emptyset$ denotes the spot diameter of a laser beam to be irradiated, $\lambda$ denotes the wavelength of a laser beam L in a vacuum state, and n denotes the refractive index of a transparent substrate.

Moreover, the track pitch TP between recording tracks of the optical recording medium 10 of the present invention is set to approx. 1.5 μm.

Furthermore, the groove 2a is formed so that the relation of $0.200 \leq [\{D/(\lambda/n)\}/(W/\emptyset)] \leq 0.330$ is effectuated when assuming the width of the groove 2a as W and the depth of the groove 2a as D.

In this case, $\emptyset$ denotes the spot diameter of a laser beam to be irradiated, $\lambda$ denotes the wavelength of a laser beam in a vacuum state, and n denotes the refractive index of a transparent substrate.

The first dielectric layer 3 and second dielectric layer 6 improve the C/N characteristic and prevent the first recording layer 4 and second recording layer 5 from corroding.

That is, because components including chlorine ions or the like for corroding metals are frequently contained in the transparent substrate 2 and the protective layer 7, it is possible to avoid the first recording layer 4 and second recording layer 5 from being directly influenced by components for corroding metals by forming the first dielectric layer 3 and the second dielectric layer 6 so as to hold the first recording layer 4 and second recording layer 5 between the layers 3 and 6.

It is necessary to form the first dielectric layer 3 and second dielectric layer 6 with a material having a small absorbing power for an applied wavelength of the laser beam L for recording or reproducing data.

For example, the first dielectric layer 3 and second dielectric layer 6 are respectively formed on the transparent substrate 2 as a thin film by a thin-film forming art such as one of various sputtering methods by using one of such materials as $Si_3N_4$, SiN, AlN, $Al_2O_3$, AlSiNO, $HfO_2$, ZnS, $ZrO_2$, $Y_2O_3$, MgO, $SiO_2$, $MgF_2$, and LiF. However, it is preferable to use a material having a performance for passing the laser beam L incoming to record or reproduce a record signal but not passing oxygen or moisture, and not containing oxygen as the material for forming the first dielectric layer 3 and use SiN, $Si_3N_4$, or AlN as the material.

In the above case, the first recording layer 4 and second recording layer 5 constituting the optical recording medium 10 of the present invention respectively include a magneto-optical recording layer and the magneto-optical layer is formed as a thin film on the first dielectric layer 3.

The magneto-optical layer is made of a material in which the coercive force is decreased due to a temperature rise exceeding Curie temperature and which causes magnetic reversal in the direction of an external magnetic field and has a magneto-optical characteristic such as Kerr effect or Faraday effect. For example, the layer is made of a rare-earth and transition-metal alloy such as TbFeCo, TbFeCoCr, or GdFeCo.

It is permitted that a recording section 9 is formed with a single layer such as only a magneto-optical layer or with a multilayer structure obtained by further laminating a dielectric layer as proposed for a CAD (Center Aperture Detector) disk or MSR (Magnetically induced Super Resolution) disk.

Moreover, the uneven shape on the groove 2a of the transparent substrate 2 is transferred to the first recording layer 4 and second recording layer 5. In the case of the optical recording medium 10, recording tracks in or from which a record signal is recorded or reproduced are formed on the first recording layer 4 and second recording layer 5 along the groove 2a. Moreover, the optical recording medium 10 is constituted so that the pitch between recording tracks becomes 1.5 μm or 1.5±0.01 μm by considering an error range. In the case of the optical recording medium 10, it is possible to improve the recording density compared to the case of a conventional optical recording medium having a track pitch of 1.6 μm. Therefore, the optical recording medium 10 allows the capacity to be increased while keeping the outside diameter equal to that of a conventional optical recording medium.

Moreover, in the case of the optical recording medium of the present invention, because of numerically specifying the width and depth of the groove 2a and the spot diameter $\emptyset$ and wavelength $\lambda$ of a laser beam for irradiating the angle between wall faces of the groove, it is possible to sufficiently secure the defocus tolerance of a laser beam for recording or reproducing a signal even if the track pitch is further narrowed than ever and keep a high reliability.

The reflective layer 7 constituting the optical recording medium 10 is formed on the second dielectric layer 5 as a thin film. The reflective layer 7 has a function for reflecting the laser beam L passing through the first recording layer 4, second recording layer 5 and second dielectric layer 6 as well as a function as a heat sink for preventing heat from being accumulated in the first recording layer 4 and second recording layer 5 due to a laser beam irradiated toward the first recording layer 4 and second recording layer 5.

The optical recording medium 10 makes it possible to improve the utilization efficiency of the laser beam L when recording or reproducing data because the reflective layer 7 has a function for reflecting a laser beam. As a material for forming the reflective layer 7, it is preferable to use a non-magnetic metal element serving as a thermally good conductor or its compound independently or compounding metal elements. The reflective layer 7 is made of, for example, Au, Al, and Ti.

The protective layer 8 is formed on the reflective layer 7 as a thin film by curing an ultraviolet-curing resin applied by a spin coater or the like.

The optical recording medium 10 makes it possible to avoid the first recording layer 4, second recording layer 5, and reflective layer 7 from being deteriorating due to oxidation or the like because of including the protective layer 8.

Moreover, the medium 10 makes it possible to prevent a crack from being produced on each layer formed on the transparent substrate 2.

The protective layer 8 may contain various lubricants or various lubricants may be applied to the surface of the layer 8.

Thereby, the optical recording medium 10 can avoid the recording head of a recording/reproducing apparatus or the protective layer 8 from abrading or producing heat when sliding the head on the protective-layer-8 forming surface.

BRIEF DESCRIPTION OF THE DRAWINGS

FIG. 7 shows the relation between defocus tolerance and [{D/(λ/n)}/(W/Ø)] of a magneto-optical disk of the present invention.

DETAILED DESCRIPTION OF THE PREFERRED EMBODIMENTS

Then, an optical recording medium of the present invention is described below by using specific embodiments and comparative examples. However, the present invention is not restricted to the following embodiments or comparative examples.

In the following embodiments and comparative examples, a magneto-optical disk (MD) is described as an optical recording medium of the present invention.

Embodiment 1

Figure 1:
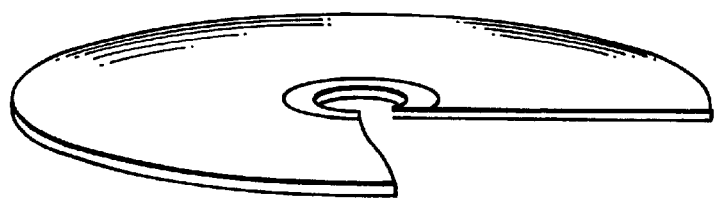
FIG. 1 shows a schematic sectional view of a magneto-optical recording medium of the present invention.

A magneto-optical disk in which various layers are formed on a discoid transparent substrate 2 having a diameter of 64 mm was fabricated as an optical recording medium 10 having the structure shown in FIG. 1.

Materials used to form the various layers are shown below.

Transparent substrate 2: Polycarbonate resin
First dielectric layer 3: SiN
First recording layer 4: GdFeCo
Second recording layer 5: TbFeCoCr
Second dielectric layer 6: SiN
Reflective layer 6: AlAuTi
Protective layer 7: Ultraviolet-curing resin The thickness of each layer was set in accordance with the publicly-known MD standard and the recording-track pitch was set to 1.5 µm.

Moreover, the magneto-optical disk of embodiment 1 has the following features.

When assuming the width of a groove 2a as W, W/Ø is equal to 0.5411.

When assuming the depth of the groove 2a as D, D/(λ/n) is equal to 0.1385.

The angle θ between wall faces of the groove 2a has a minimum value of 142.9° and a maximum value of 155.4°.

When assuming the width of the groove 2a as W and the depth of the groove 2a as D, [{D/(λ/n)}/(W/Ø)] is equal to 0.25597.

(In the above case, Ø denotes the spot diameter of a laser beam to be irradiated, λ denotes the wavelength of a laser beam in a vacuum state, and n denotes the refractive index of a transparent substrate.)

Embodiment 2 to Embodiment 10

In the case of each of the embodiments 2 to 10, a magneto-optical disk was fabricated in which various layers are formed on a transparent substrate by using the same film configuration as the case of the above embodiment 1 in accordance with the MD standard.

Moreover, for each of the embodiments 2 to 10, the pitch between recording tracks was set to 1.5 µm.

Magneto-optical disks of the embodiment 2 to embodiment 10 were fabricated so that they have values of the above W/Ø, D/(λ/n), maximum and minimum values of the angle θ between wall faces of the groove 2a, and values of [{D/(λ/n)}/(W/Ø)] different from each other.

Moreover, in the case of each magneto-optical disk of the embodiment 2 to embodiment 10, relations of $0.470 \leq W/Ø \leq 0.610$ and $0.120 \leq D/(λ/n) \leq 0.142$ were effectuated, the angle θ between wall faces of a groove was kept at 150°±10°, and the relation of $0.200 \leq [\{D/(λ/n)\}/(W/Ø)] \leq 0.330$ was effectuated.

Comparative Example 1

A magneto-optical disk in which layers were formed on a transparent substrate was fabricated by using the same film configuration as the case of the above embodiment 1 in accordance with the MD standard.

Also in this example, the pitch between recording tracks was set to 1.5 (µm).

The magneto-optical disk of the comparative example 1 has the following features.

When assuming the width of a groove 2a as W, W/Ø is equal to 0.5022.

When assuming the depth of the groove 2a as D, D/(λ/n) is equal to 0.1479.

The angle θ between wall faces of the groove 2a has a minimum value of 155.2° and a maximum value of 161.2°.

When assuming the width of the groove 2a as W, and the depth of the groove 2a as D, [{D/(λ/n)}/(W/Ø)] is equal to 0.29446.

Comparative Example 2

A magneto-optical disk in which layers were formed on a transparent substrate was fabricated by using the same film configuration as the case of the above embodiment 1 in accordance with the MD standard.

Also in this example, the pitch between recording tracks was set to 1.5 (µm).

The magneto-optical disk of the comparative example 2 has the following features.

When assuming the width of a groove 2a as W, W/Ø is equal to 0.6123.

When assuming the depth of the groove 2a as D, D/(λ/n) is equal to 0.1145.

The angle θ between wall faces of the groove 2a has a minimum value of 154.2° and a maximum value of 160.5°.

When assuming the width of the groove 2a as W, and the depth of the groove 2a as D, [{D/(λ/n)}/(W/Ø)] is equal to 0.18694.

Comparative Example 3

A magneto-optical disk in which layers were formed on a transparent substrate was fabricated by using the same film configuration as the case of the above embodiment 1 in accordance with the MD standard.

Also in this example, the pitch between recording tracks was set to 1.5 ($\mu$m).

The magneto-optical disk of the comparative example 3 has the following features.

When assuming the width of a groove 2a as W, W/Ø is equal to 0.4215.

When assuming the depth of the groove 2a as D, D/($\lambda$/n) is equal to 0.1444.

The angle $\theta$ between wall faces of the groove 2a has a minimum value of 154.8° and a maximum value of 161.0°.

When assuming the width of the groove 2a as W, and the depth of the groove 2a as D, [{D/($\lambda$/n)}/(W/Ø)] is equal to 0.34261.

Values of W/Ø and D/($\lambda$/n), the angle $\theta$ between wall faces of the groove 2a, and the value of [{D/($\lambda$/n)}/(W/Ø)] of each of the above magneto-optical disks of the above embodiment 1 to embodiment 10 and comparative example 1 to comparative example 3 are shown in Table 1 below.

ment 10 and comparative example 1 to comparative example 3 when changing defocus tolerances ($\mu$m) of the laser beam on each magneto-optical disk and slowly increasing the defocus tolerance at near and Far-sides of the disk respectively.

Figure 5:
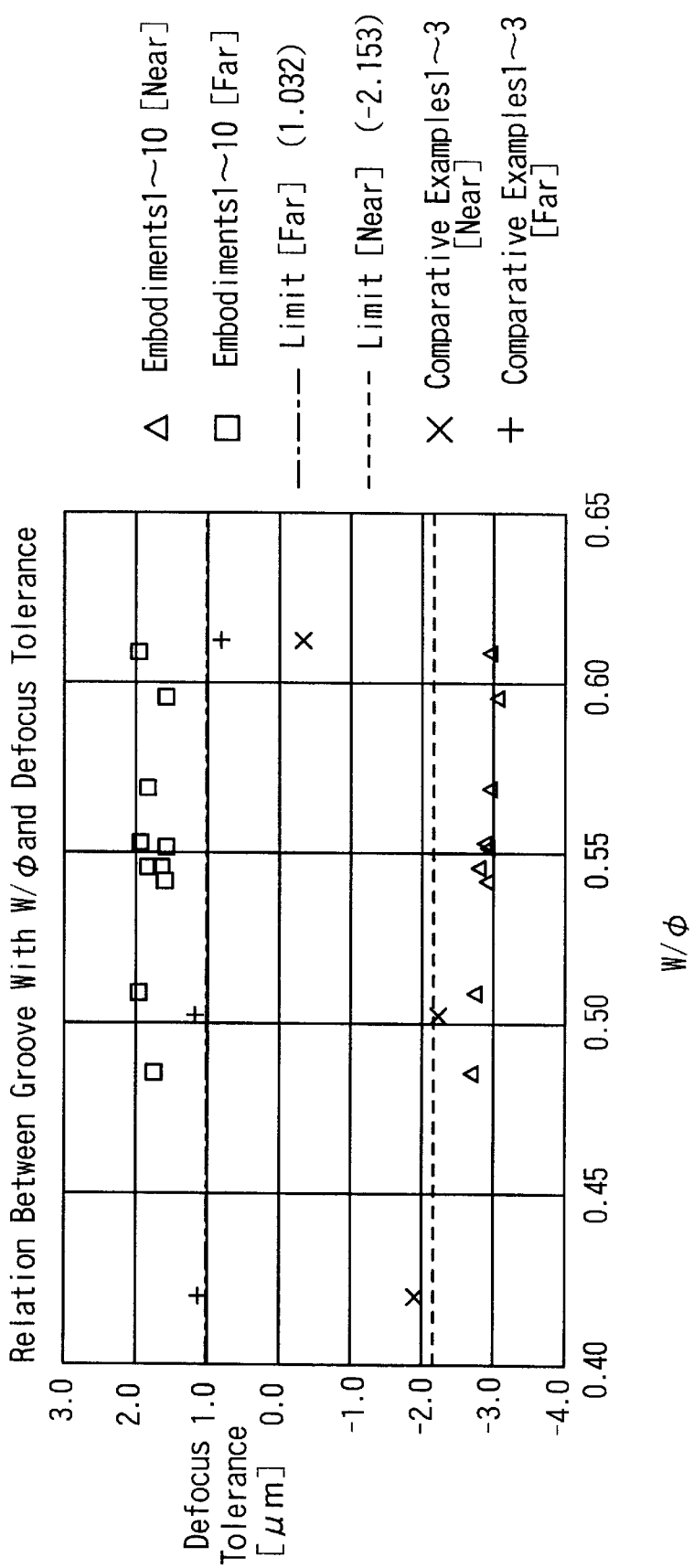
FIG. 5 shows the relation between defocus tolerance and (W/Ø) of a magneto-optical disk of the present invention.
Figure 6:
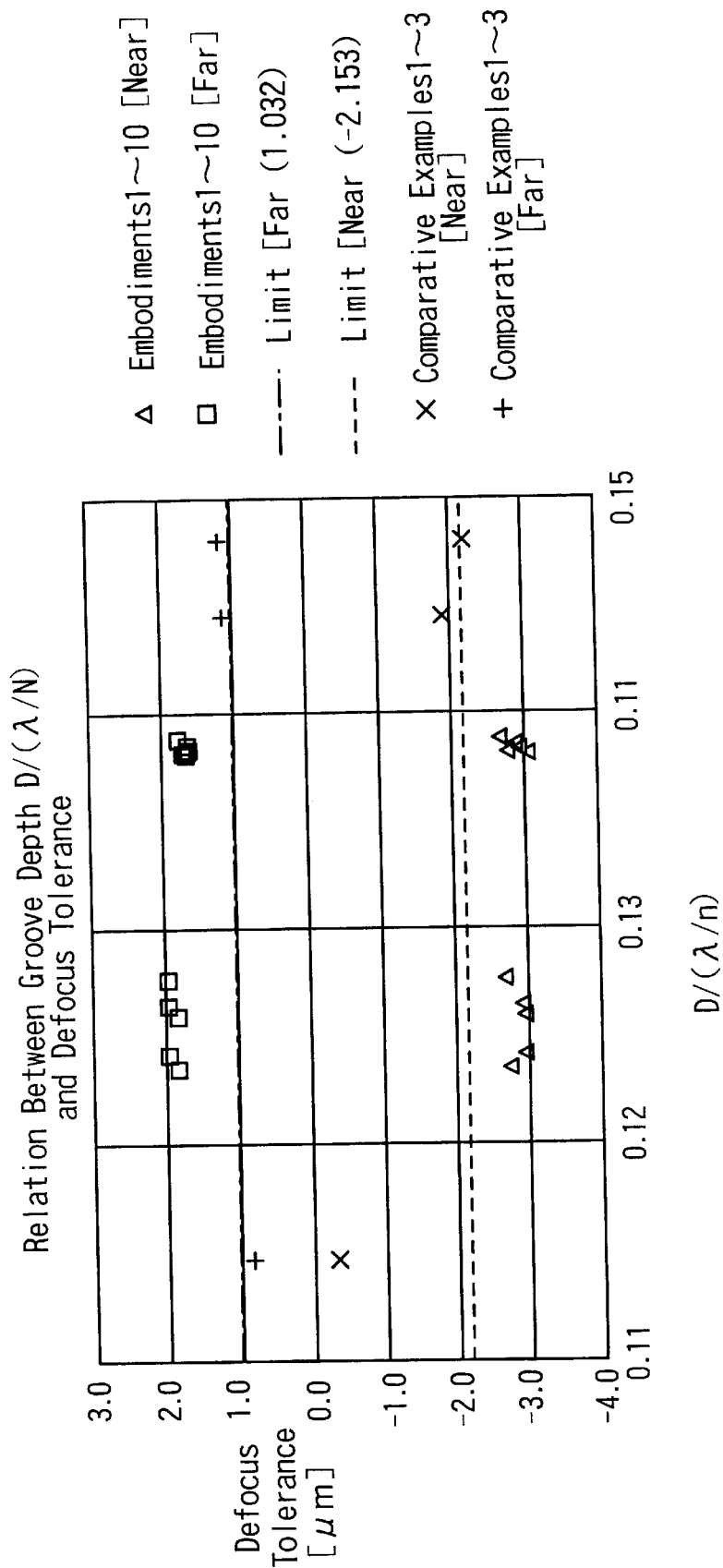
FIG. 6 shows the relation between defocus tolerance and {D/(λ/n)} of a magneto-optical disk of the present invention.

Moreover, FIG. 5 shows the relation between defocus tolerance and (W/Ø) of each magneto-optical disk of the embodiment 1 to embodiment 10 and comparative example 1 to comparative example 3, FIG. 6 shows the relation between defocus tolerance and {D/($\lambda$/n)} of each magneto-optical disk, and FIG. 7 shows the relation between defocus tolerance and [{D/($\lambda$/n)}/(W/Ø)] of each magneto-optical disk.

In FIGS. 5 to 7, symbol $\Delta$ shows the defocus tolerance ($\mu$m) at the moment three address errors or more occur which are read from by a laser beam from a groove of each magneto-optical disk of the embodiment 1 to embodiment 10 and comparative example 1 to comparative example 3 at the Near-side of the magneto-optical disk and symbol $\square$ denotes the defocus tolerance ($\mu$m) read by a laser beam from a groove of each magneto-optical disk of the embodiment 1 to embodiment 10 and comparative example 1 to comparative example 3 at the Far-side of the disk.

TABLE 1

| Sample | $\left(\dfrac{D/(\lambda/\nu)}{W/\varnothing}\right)$ | D/($\lambda$/n) | (W/φ) | Angle (°) (Angle $\theta$ between wall faces of groove) min | max | Defocus tolerance Near ($\mu$m) | Far ($\mu$m) |
|---|---|---|---|---|---|---|---|
| Embodiment 1 | 0.25597 | 0.1385 | 0.5411 | 142.9 | 155.4 | −2.920 | 1.586 |
| Embodiment 2 | 0.28578 | 0.1387 | 0.4855 | 142.9 | 153.0 | −2.675 | 1.736 |
| Embodiment 3 | 0.25063 | 0.1383 | 0.5517 | 143.0 | 155.2 | −2.950 | 1.563 |
| Embodiment 4 | 0.23174 | 0.1381 | 0.5959 | 144.6 | 157.9 | −3.105 | 1.592 |
| Embodiment 5 | 0.25328 | 0.1382 | 0.5455 | 143.0 | 156.5 | −2.790 | 1.646 |
| Embodiment 6 | 0.22872 | 0.1265 | 0.5533 | 141.1 | 155.8 | −2.925 | 1.940 |
| Embodiment 7 | 0.25075 | 0.1279 | 0.5100 | 140.9 | 155.7 | −2.735 | 1.940 |
| Embodiment 8 | 0.22129 | 0.1261 | 0.5696 | 140.5 | 156.5 | −2.965 | 1.806 |
| Embodiment 9 | 0.20369 | 0.1242 | 0.6099 | 142.5 | 160.0 | −2.966 | 1.950 |
| Embodiment 10 | 0.22650 | 0.1236 | 0.5457 | 140.3 | 159.1 | −2.796 | 1.825 |
| Comparative example 1 | 0.29446 | 0.1479 | 0.5022 | 155.2 | 161.2 | −2.218 | 1.210 |
| Comparative example 2 | 0.18694 | 0.1145 | 0.6123 | 154.2 | 160.5 | −0.357 | 0.799 |
| Comparative example 3 | 0.34261 | 0.1444 | 0.4215 | 154.8 | 161.0 | −1.881 | 1.158 |
| Limit | | | | | | −2.153 | 1.032 |

Evaluation of Characteristics

By using an optical system according to the MD standard and thereby, applying a laser beam to recording tracks of each magneto-optical disk of the embodiment 1 to embodiment 10 and comparative example 1 to comparative example 3 fabricated as described above and changing defocus tolerances of the laser beam on each magneto-optical disk, the relation between the defocus tolerance on one hand and values of W/Ø and D/($\lambda$/n), angle $\theta$ between wall faces of the groove 2a, and the value of [{D/($\lambda$/n)}/(W/Ø)] on the other was examined.

The following are measuring conditions in the above case.

Linear velocity of magneto-optical disk: 1.2-1.4 (m/s)

Wavelength $\lambda$ of laser beam: 780 (nm)

Numerical aperture (N.A.) of objective lens: 0.45

The above Table 1 shows the defocus tolerance ($\mu$m) of a laser beam the moment three address errors or more occur which are read by a laser beam from a groove of each magneto-optical disk of the above embodiment 1 to embodi- Moreover, symbol × shows the defocus tolerance ($\mu$m) at the moment three address errors or more occur which are read by a laser beam from a groove of each magneto-optical disk of the comparative example 1 to comparative example 3 at the Near-side of the disk and symbol + shows the defocus tolerance ($\mu$m) at the moment three address errors or more occur which are read by a laser beam from a groove of each magneto-optical disk of the comparative example 1 to comparative example 3 at the Far-side of the disk.

In FIGS. 5 to 7, an alternate long and short dash line shows a critical defocus tolerance (1.032 $\mu$m) at the Far-side at which occurrence of errors is allowed in the MD standard and a broken line shows a critical defocus tolerance (−2.153 $\mu$m) at the Near-side at which occurrence of errors is allowed in the MD standard.

Moreover, in FIGS. 5 to 7, the focal position of a laser beam further goes to the inner part of the signal-recording face as the value of the defocus tolerance shown by the ordinate increases in the positive direction, and the focal position of the laser beam further comes to this side of the signal-recording face as the absolute value of the defocus tolerance increases in the negative direction.

That is, FIGS. 5 to 7 show that when a plot is present inside of the alternate long and short dash line and the broken line, that is, in the area enclosed by the alternate long and short dash line and broken line, an address error frequently occurs even due to a slight defocus tolerance.

However, FIGS. 5 to 7 show that when a plot is present outside of the alternate long and short line and broken line, a laser beam can follow a recording track even when the defocus tolerance increases.

Moreover, FIGS. 5 to 7 show that a defocus margin increases as the difference between Far-side defocus tolerance and Near-side defocus tolerance increases, that is, the difference between plot intervals of the both tolerances increases.

As shown in FIGS. 5 and 6, in the case of magneto-optical disks of the embodiment 1 to embodiment 10 in which the relation of $0.470 \leq W/\varnothing \leq 0.61$ is effectuated when assuming the width of a groove as W, the relation of $0.120 \leq D/(\lambda/n) \leq 0.142$ is effectuated when assuming the depth of the groove as D, and the angle $\theta$ between wall faces of the groove is kept at $150° \pm 10°$ in fabricating the disks so that the recording-track pitch becomes 1.5 ($\mu$m), every plot exceeds the critical defocus tolerance (1.032 $\mu$m) at the Far-side and the critical defocus tolerance (-2.153 $\mu$m) at the Near-side in which occurrence of errors is allowed in the MD standard and thus, it is possible to increase a defocus margin.

Moreover, as shown in FIG. 7, in the case of magneto-optical disks of the embodiment 1 to embodiment 10 in which the relation of $0.200 \leq [\{D/(\lambda/n)\}/(W/\varnothing)] \leq 0.33$ is effectuated when assuming the width of a groove as W and the depth of the groove as D in fabricating the disks so that the recording-track pitch becomes 1.5 ($\mu$m), every plot exceeds the critical defocus tolerance (1.032 $\mu$m) at the Far-side and the critical defocus tolerance (-2.153 $\mu$m) at the Near-side in which occurrence of errors is allowed in the MD standard and thus, it is possible to increase a defocus margin.

However, in the case of the magneto-optical disk of the comparative example 1 in which the value of $D/(\lambda/n)$ is 0.1479 which exceeds 0.142 when assuming the depth of the groove 2a as D, the critical defocus tolerance at the Far-side and the critical defocus tolerance at the Near-side in which occurrence of errors is allowed in the MD standard are reached as shown in FIG. 6. However, it is found that the defocus margin is small compared to the case of magneto-optical disks of the above-described embodiment 1 to embodiment 10.

Moreover, in the case of the magneto-optical disk of the comparative example 2 in which the value of $W/\varnothing$ exceeds 0.610 when assuming the width of a groove as W and the value of $D/(\lambda/n)$ is less than 0.120 and the value of $[\{D/(\lambda/n)\}/(W/\varnothing)]$ is less than 0.200 when assuming the depth of the groove as D, and the magneto-optical disk of the comparative example 3 in which the value of $W/\varnothing$ is less than 0.470 and the value of $D/(\lambda/n)$ exceeds 0.142 and the value of $[\{D/(\lambda/n)\}/(W/\varnothing)]$ exceeds 0.330, it is found that at least either of the critical defocus tolerances at the Far and Near-sides in which occurrence of errors is allowed in the MD standard cannot be achieved as shown in FIGS. 5 to 7 and the defocus margin is small compared to the case of the magneto-optical disks of the embodiment 1 to embodiment 10.

As described above, in the case of an optical recording medium in which a groove is formed on a transparent substrate along a recording track, both sidewalls of the groove are respectively formed into an independent wobbling shape, the relation of $0.470 \leq W/\varnothing \leq 0.610$ is effectuated when assuming the width of the groove as W, the relation of $0.120 \leq D/(\lambda/n) \leq 0.142$ and the relation of $0.200 \leq [\{D/(\lambda/n)\}/(W/\varnothing)] \leq 0.330$ are effectuated when assuming the depth of the groove as D, and the angle $\theta$ between wall faces of the groove is kept at $150° \pm 10°$, it is found that a large defocus margin can be obtained even if setting the recording-track pitch to 1.5 ($\mu$m) which is smaller than ever.

A magneto-optical recording medium of a second aspect of the present invention is a magneto-optical recording medium in which a first dielectric layer, a first recording layer, a second recording layer, a second dielectric layer, a reflective layer, and a protective layer are sequentially formed on a transparent substrate, and an in-plane-directional double-refractive index is set in a range of -40 (nm) to 25 (nm) and a vertical-directional double-refractive index is set in a range of 200 to 300 (nm).

A magneto-optical recording medium of the present invention is described below with an example. However, the present invention is not restricted to the following magneto-optical recording medium. Moreover, the transparent substrate, recording layers, and dielectric layers use the same materials as the case of the first embodiment. The above first dielectric layer 3 is normally formed at a thickness of 30 to 100 (nm) and the second dielectric layer 6 is normally formed at a thickness of 5 to 100 (nm).

Embodiment 11

Figure 2:
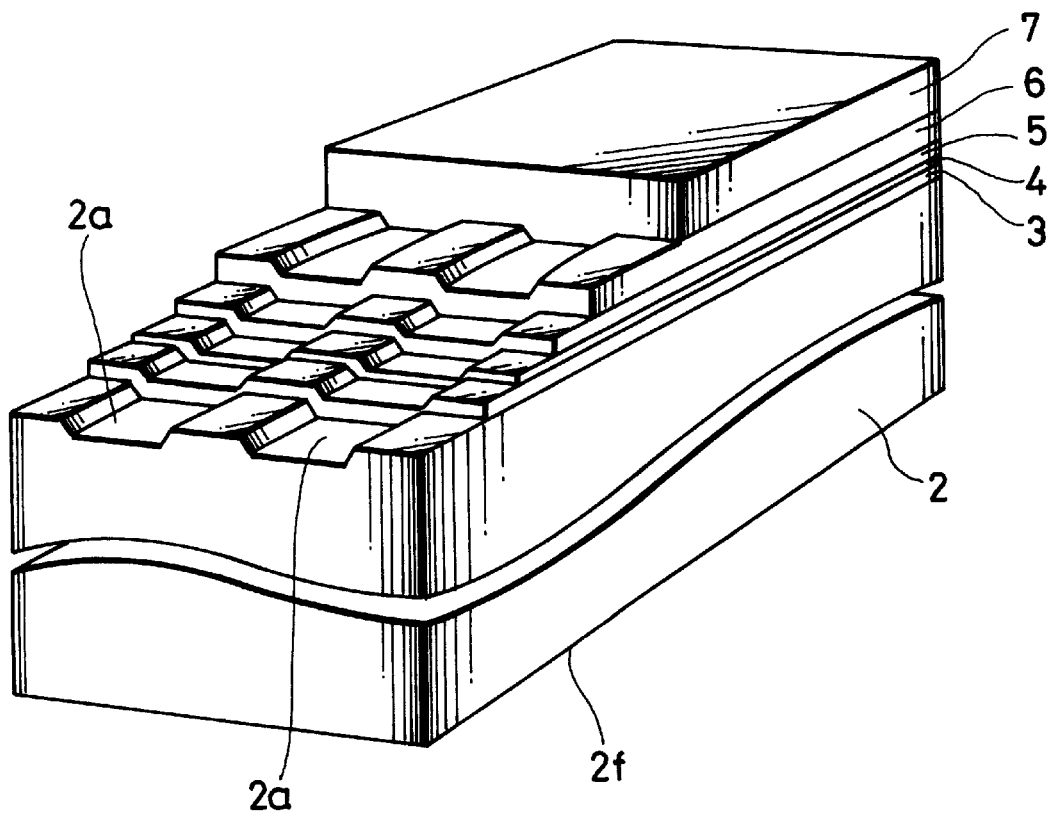
FIG. 2 shows a schematic perspective view of a locally-cutout sectional-layer structure of a magneto-optical recording medium of the present invention.
Figure 3:
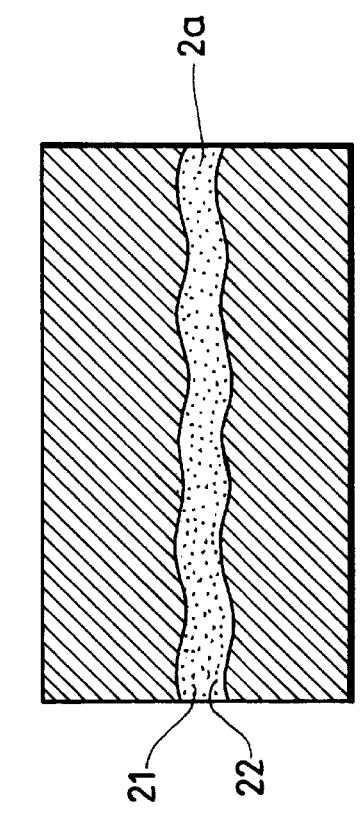
FIG. 3 shows a schematic view of the shape of a groove of a magneto-optical recording medium of the present invention.
Figure 4:
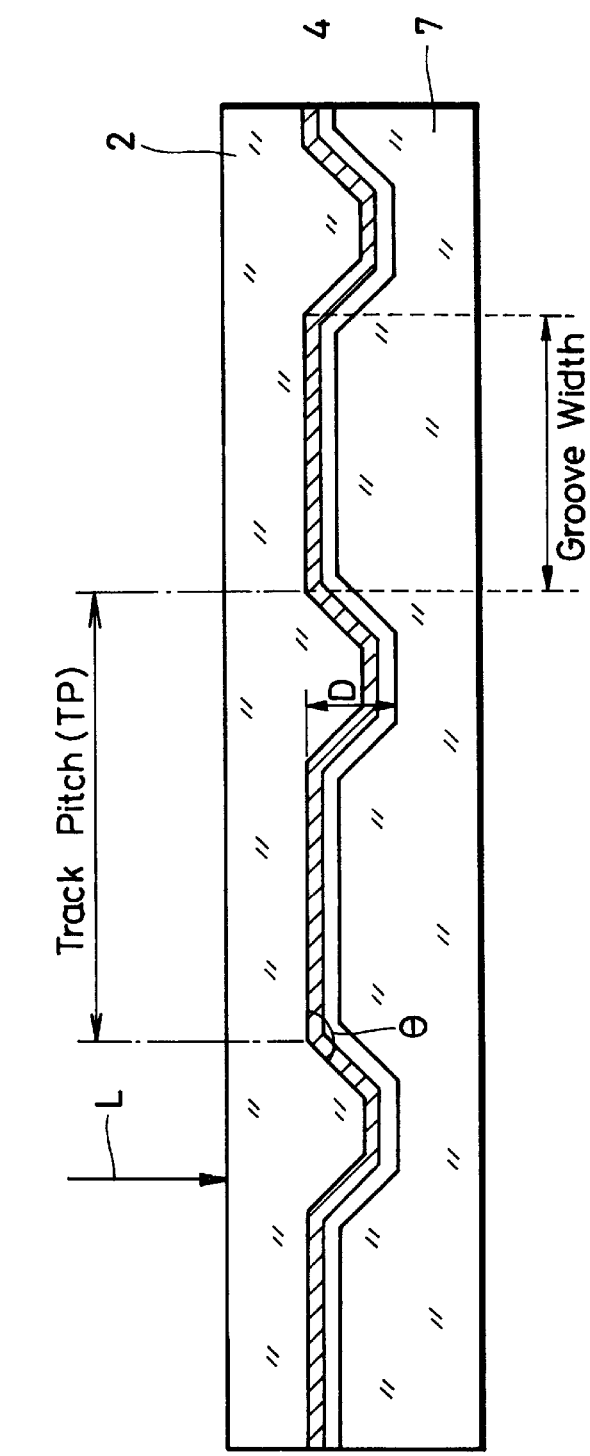
FIG. 4 shows a schematic sectional view of a magneto-optical recording medium of the present invention.

A magneto-optical recording medium having the structure shown in FIG. 2 was fabricated as described below.

A discoid substrate having an outside diameter of 64 (mm) and a thickness of 1.2 (mm) was fabricated with polycarbonate resin as the transparent substrate 2.

Then, a silicon-nitride film was formed on the transparent substrate 2 through sputtering in Ar atmosphere by using Si as a target to form the first dielectric layer 3.

Then, the first recording film 4 made of a GdFeCo alloy was formed through sputtering in Ar atmosphere.

Then, the second recording layer 5 made of a TbFeCoCr alloy was formed through sputtering in Ar atmosphere.

Then, a silicon-nitride film was formed to make the second dielectric layer 6 through sputtering in Ar atmosphere by using an Si as a target.

A metallic layer is formed on the second dielectric layer 6 through sputtering by using AlAuTi alloy as a target to make the reflective layer 7.

Then, the protective layer 8 was formed on the reflective layer 7 by spin-coating the layer 7 with an ultraviolet-curing resin to fabricate a purposed magneto-optical recording medium 10.

The in-plane-directional double-refractive index of the transparent substrate 2 of the magneto-optical recording medium 10 fabricated as described above was set to -10 (nm) and the vertical-directional double-refractive index of the substrate 2 was set to 220 (nm).

It is possible to measure the in-plane-directional double refraction and vertical-directional double refraction of the transparent substrate 2 by using, e.g. a double-refraction measuring instrument such as PROmetenusMT-136 made by Dr. Schenk.

Embodiment 12

The in-plane-directional double-refractive index of a transparent substrate 2 of a magneto-optical recording medium 10 was set to 25 (nm) and the vertical-directional double-refractive index of it was set to 200 (nm).

Moreover, a first dielectric layer 3, a first recording layer 4, a second recording layer 5, a second dielectric layer 6, a reflective layer 7, and a protective layer 8 were formed in the same manner as the case of the above embodiment 11 and a magneto-optical recording medium was fabricated in accordance with the same film-forming sequence as the case of the embodiment 11.

Embodiment 13

The in-plane-directional double-refractive index of a transparent substrate 2 of a magneto-optical recording medium 10 was set to −7 (nm) and the vertical-directional double-refractive index of it was set to 300 (nm).

Moreover, a first dielectric layer 3, a first recording layer 4, a second recording layer 5, a second dielectric layer 6, a reflective layer 7, and a protective layer 8 were formed in the same manner as the case of the embodiment 11 and a magneto-optical recording medium was fabricated in accordance with the same film-forming sequence as the case of the embodiment 11.

Embodiment 14

The in-plane-directional double-refractive index of a transparent substrate 2 of a magneto-optical recording medium 10 was set to −40 (nm) and the vertical-directional double-refractive index of it was set to 250 (nm).

Moreover, a first dielectric layer 3, a first recording layer 4, a second recording layer 5, a second dielectric layer 6, a reflective layer 7, and a protective layer 8 were formed in the same manner as the case of the above embodiment 11 and a magneto-optical recording medium was fabricated in accordance with the same film-forming sequence as the case of the embodiment 11.

Then, comparative examples are described below in order to compare them with a magneto-optical recording medium of the present invention.

Comparative Example 4

The in-plane-directional double-refractive index of a transparent substrate 2 of a magneto-optical recording medium 10 was set to 5 (nm) and the vertical-directional double-refractive index of it was set to 190 (nm).

Moreover, a first dielectric layer 3, a first recording layer 4, a second recording layer 5, a second dielectric layer 6, a reflective layer 7, and a protective layer 8 were formed in the same manner as the case of the embodiment 11 and a magneto-optical recording medium was fabricated in accordance with the same film-forming sequence as the case of the embodiment 11.

Comparative Example 5

The in-plane-directional double-refractive index of a transparent substrate 2 of a magneto-optical recording medium 10 was set to −50 (nm) and the vertical-directional double-refractive index of it was set to 310 (nm).

Moreover, a first dielectric layer 3, a first recording layer 4, a second recording layer 5, a second dielectric layer 6, a reflective layer 7, and a protective layer 8 were formed in the same manner as the case of the embodiment 11 and a magneto-optical recording medium was fabricated in accordance with the same film-forming sequence as the case of the embodiment 11.

Comparative Example 6

The in-plane-directional double-refractive index of a transparent substrate 2 of a magneto-optical recording medium 10 was set to −12 (nm) and the vertical-directional double-refractive index of it was set to 400 (nm).

Moreover, a first dielectric layer 3, a first recording layer 4, a second recording layer 5, a second dielectric layer 6, a reflective layer 7, and a protective layer 8 were formed in the same manner as the case of the embodiment 11 and a magneto-optical recording medium was fabricated in accordance with the same film-forming sequence as the case of the embodiment 11.

Comparative Example 7

The in-plane-directional double-refractive index of a transparent substrate 2 of a magneto-optical recording medium 10 was set to 28 (nm) and the vertical-directional double-refractive index of it was set to 400 (nm).

Moreover, a first dielectric layer 3, a first recording layer 4, a second recording layer 5, a second dielectric layer 6, a reflective layer 7, and a protective layer 8 were formed in the same manner as the case of the embodiment 11 and a magneto-optical recording medium was fabricated in accordance with the same film-forming sequence as the case of the embodiment 11.

Jitter values of sample magneto-optical recording media of the embodiment 11 to embodiment 14 and comparative example 4 to comparative example 7 fabricated as described above were measured.

The jitter values can be obtained by using a jitter meter (KENWOOD DB-8260) and thereby evaluating characteristics of signals fetched from an optical-disk error-rate evaluation system. In this case, the jitter values are 3T jitter values corresponding to a short-wavelength laser beam.

When a jitter level of 20 (ns) or lower was obtained, it was evaluated that a characteristic enough for practical use was obtained.

Moreover, signals were read from respective sample magneto-optical recording media of the embodiment 11 to embodiment 14 and comparative example 4 to comparative example 7 by using three types of reproducing apparatuses (first to third drives) having optical characteristics different from each other to evaluate the signals.

For selection of drives, a blank drive having a standard defocus tolerance was selected as a first drive, a drive having a defocus tolerance which is narrow at the Near-side compared to the case of the first drive, that is, having a low tolerance at the Near-side was selected as a second drive, and a drive having a defocus tolerance which is narrow at the Far-side compared to the case of the first drive, that is, having a low tolerance at the Far-side was selected as a third drive.

In this case, the Near-side denotes a case of making an optical pickup approach to a magneto-optical recording medium and the Far-side denotes a case of separating the optical pickup from the magneto-optical recording medium and a defocus tolerance is specified by measuring an error-rate level at the Near or Far-side.

For evaluation of read signals, a signal having a low error rate and having a C/N enough for practical use is shown by symbol ○ and a signal having too many errors and not having a C/N enough for practical is shown by symbol ×.

Measuring conditions are shown below.

| Laser wavelength: | 780 (nm) |
|---|---|
| Numerical aperture NA of objective lens: | 0.45 |
| Laser power for recording: | 4.55 (mW) |
| Reproducing laser power: | 0.6 (mW) |
| Bias magnetic field: | 100 (Oe) |

The following Table 2 shows in-plane-directional double refractive indexes (nm), vertical-directional double refractive indexes (nm), and jitter values (ns) of magneto-optical recording media of the embodiment 11 to embodiment 14 and comparative example 4 to comparative example 5 and evaluation results of signals read from the magneto-optical recording media when applying the above first to third drives.

TABLE 2

|  | In-plane-directional double-refractive index (nm) | Vertical-direction double-refractive index (nm) | Jitter value (ns) | First drive | Second drive | Third drive |
|---|---|---|---|---|---|---|
| Embodiment 11 | −10 | 220 | 18 | ○ | ○ | ○ |
| Embodiment 12 | 25 | 200 | 19.1 | ○ | ○ | ○ |
| Embodiment 13 | −7 | 300 | 20 | ○ | ○ | ○ |
| Embodiment 14 | −40 | 250 | 19.4 | ○ | ○ | ○ |
| Comparative example 4 | 5 | 190 | 21.5 | ○ | ○ | X |
| Comparative example 5 | −50 | 310 | 21.8 | X | ○ | ○ |
| Comparative example 6 | −12 | 400 | 23 | ○ | X | X |
| Comparative example 7 | 28 | 330 | 22.1 | X | ○ | ○ |

As shown in Table 2, in the case of magneto-optical recording media 1 of the embodiment 11 to embodiment 14 in which in-plane-directional double-refractive indexes are set in a range of −40 (nm) to 25 (nm) and vertical-directional double-refractive indexes are set in a range of 200 to 300 (nm), every jitter value is kept at 20 (ns) or less, the jitter characteristic is improved, and every value is enough for practical use.

Moreover, in the case of the magneto-optical recording media 10 of the embodiment 11 to embodiment 14, in-plane-directional double-refractive indexes and vertical-directional double-refractive indexes of the transparent substrates 2 are specified in the above range. Therefore, even when reading signals by any one of three types of reproducing apparatuses (first to third drives) having optical characteristics different from each other, it was possible to accurately trace a magneto-optical recording layer in accordance with each drive used and a C/N having a small error rate and enough for practical use was obtained.

The comparative example 4 is an example obtained by setting the vertical-directional double-refractive index to 190 (nm) that is less than 200 (nm). In the case of this magneto-optical recording medium, a reproduced signal preferable for practical use was not obtained because the jitter value became higher than 20 (ns) and the error rate rose when using the above third drive.

The comparative example 5 is an example obtained by setting the in-plane-directional double-refractive index to −50 (nm) that is less than −40 (nm) and the vertical-directional double-refractive index to 310 (nm) that is larger than 300 (nm). In the case of this magneto-optical recording medium, a reproduced signal preferable for practical use was not obtained because the jitter value became higher than 20 (ns) and the error rate rose when using the first drive.

The comparative example 6 is an example obtained by setting the vertical-directional double-refractive index to 400 (nm) that is larger than 300 (nm). In the case of this magneto-optical recording medium, a reproduced signal preferable for practical use was not obtained because the jitter value became higher than 20 (ns) and the error rate rose when using the second and third drives.

The comparative example 7 is an example obtained by setting the in-plane-directional double-refractive index to 28 (nm) which is larger than 25 (nm) and the vertical-directional double-refractive index to 330 (nm) which is larger than 300 (nm). In the case of this magneto-optical recording medium, a reproduced signal preferable for practical use was not obtained because the jitter value became higher than 20 (ns) and the error rate rose when using the first drive.

As described above, by specifying the in-plane-directional double-refractive index and vertical-directional double-refractive index of the transparent substrate 2 constituting the magneto-optical recording medium 1 in a predetermined range, it is possible to improve the jitter characteristic, accurately trace a magneto-optical recording layer correspondingly to various signal reproducing apparatuses, and improve the signal quality.

According to a magneto-optical recording medium of the present invention, it is possible to improve the jitter characteristic. Therefore, the margin of an error rate is improved, the medium is not easily influenced by disturbance, it is possible to improve the quality of a signal obtained by applying a laser beam, and a stable signal characteristic is obtained.

A magneto-optical recording medium of a third aspect of the present invention has at least a first recording layer and a second recording layer on a transparent substrate. The first recording layer is made of Gd, Fe, and Co, contains 28 to 30 (atom %) of Gd, and has a thickness of 50 to 100 Å, and the second recording layer is made of Tb, Fe, and Co, contains 22 to 24 (atom %) of Tb, and has a thickness of 180 to 250 Å. Moreover, it is preferable that the second recording layer contains 1 (atom %) of Cr or less.

Then, specific embodiments and comparative examples of a magneto-optical recording medium of the present invention are described below. However, the present invention is not restricted to the following examples. A substrate material and a dielectric material are the same as the case of the first aspect of the present invention.

Embodiment 15

The magneto-optical recording medium shown in FIG. 2 was fabricated as described below.

A discoid substrate having an outside diameter of 64 (mm) and a thickness of 1.2 (mm) was fabricated with polycarbonate resin as a transparent substrate 2.

Then, a first dielectric layer 3 was formed by using Si as a target and thereby, forming a silicon-nitride film on the transparent substrate 2 through sputtering in Ar atmosphere.

Then, a first recording layer 4 was formed through sputtering in Ar atmosphere by using Gd, Fe, and Co. In this case, the Gd content in the first recording layer 4 was set to 29 (atom %) and the thickness of the layer 4 was set to 70 (Å).

Then, a second recording layer 5 was formed through sputtering in Ar atmosphere by using Tb, Fe, and Co. In this case, the Tb content in the second recording layer 5 was set to 22 (atom %) and the thickness of the layer 5 was set to 230 (Å).

Then, a second dielectric layer 6 was formed by using Si as a target and thereby forming a silicon-nitride film through sputtering in Ar atmosphere.

A reflective layer 7 was formed on the second dielectric layer 6 by using an Al—Ti alloy as a target and thereby forming a metallic layer through sputtering.

Then, a purposed magneto-optical recording medium 7 was fabricated by spin-coating the reflective layer 7 with an ultraviolet-curing resin and thereby, forming a protective layer 8 on a reflective layer 7.

Embodiment 16

A first recording layer 4 was formed on a first dielectric layer 3 through sputtering by using Gd, Fe, and Co in Ar atmosphere, in which the Gd content was set to 29 (atom %) and the thickness was set to 50 (Å).

A second recording layer 5 was formed on the first recording layer 4 through sputtering in Ar atmosphere by using Tb, Fe, and Co. In this case, the Tb content in the second recording layer 5 was set to 22 (atom %) and the thickness of the layer 5 was set to 250 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Embodiment 17

A first recording layer 4 was formed on a first dielectric layer 3 through sputtering by using Gd, Fe, and Co in Ar atmosphere, in which the Gd content was set to 28 (atom %) and the thickness was set to 100 (Å).

A second recording layer 5 was formed on the first recording layer 4 through sputtering in Ar atmosphere by using Tb, Fe, and Co. In this case, the Tb content in the second recording layer 5 was set to 24 (atom %) and the thickness of the layer 5 was set to 200 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Embodiment 18

A first recording layer 4 was formed on a first dielectric layer 3 through sputtering by using Gd, Fe, and Co in Ar atmosphere, in which the Gd content was set to 30 (atom %) and the thickness was set to 50 (Å).

A second recording layer 5 was formed on the first recording layer 4 through sputtering in Ar atmosphere by using Tb, Fe, and Co. In this case, the Tb content in the second recording layer 5 was set to 22 (atom %) and the thickness of the layer 5 was set to 250 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Embodiment 19

A first recording layer 4 was formed on a first dielectric layer 3 through sputtering by using Gd, Fe, and Co in Ar atmosphere, in which the Gd content was set to 28 (atom %) and the thickness was set to 100 (Å).

A second recording layer 5 was formed on the first recording layer 4 through sputtering in Ar atmosphere by using Tb, Fe, Co, and Cr. In this case, the Tb content in the second recording layer 5 was set to 22 (atom %), the Cr content in the layer 5 was set to 1 (atom %), and the thickness of the layer 5 was set to 200 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 8

A first recording layer 4 was formed on a first dielectric layer 3 through sputtering by using Gd, Fe, and Co in Ar atmosphere, in which the Gd content was set to 27 (atom %) and the thickness was set to 120 (Å).

A second recording layer 5 was formed on the first recording layer 4 through sputtering in Ar atmosphere by using Tb, Fe, and Co. In this case, the Tb content in the second recording layer 5 was set to 24.5 (atom %) and the thickness of the layer 5 was set to 180 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 9

A first recording layer 4 was formed on a first dielectric layer 3 through sputtering by using Gd, Fe, and Co in Ar atmosphere, in which the Gd content was set to 29 (atom %) and the thickness was set to 140 (Å).

A second recording layer 5 was formed on the first recording layer 4 through sputtering in Ar atmosphere by using Tb, Fe, and Co. In this case, the Tb content in the second recording layer 5 was set to 21 (atom %) and the thickness of the layer 5 was set to 160 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 10

A first recording layer 4 was formed on a first dielectric layer 3 through sputtering by using Gd, Fe, and Co in Ar atmosphere, in which the Gd content was set to 31 (atom %) and the thickness was set to 50 (Å).

A second recording layer 5 was formed on the first recording layer 4 through sputtering in Ar atmosphere by using Tb, Fe, and Co. In this case, the Tb content in the second recording layer 5 was set to 22 (atom %) and the thickness of the layer 5 was set to 250 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 11

A first recording layer 4 was formed on a first dielectric layer 3 through sputtering by using Gd, Fe, and Co in Ar atmosphere, in which the Gd content was set to 27 (atom %) and the thickness was set to 100 (Å).

A second recording layer 5 was formed on the first recording layer 4 through sputtering in Ar atmosphere by using Tb, Fe, and Co. In this case, the Tb content in the second recording layer 5 was set to 25 (atom %) and the thickness of the layer 5 was set to 200 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 12

A first recording layer 4 was formed on a first dielectric layer 3 through sputtering by using Gd, Fe, and Co in Ar atmosphere, in which the Gd content was set to 30 (atom %) and the thickness was set to 20 (Å).

A second recording layer 5 was formed on the first recording layer 4 through sputtering in Ar atmosphere by using Tb, Fe, and Co. In this case, the Tb content in the second recording layer 5 was set to 22 (atom %) and the thickness of the layer 5 was set to 280 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 13

A first recording layer 4 was formed on a first dielectric layer 3 through sputtering by using Gd, Fe, and Co in Ar atmosphere, in which the Gd content was set to 28 (atom %) and the thickness was set to 120 (Å).

A second recording layer 5 was formed on the first recording layer 4 through sputtering in Ar atmosphere by using Tb, Fe, Co, and Cr. In this case, the Tb content in the second recording layer 5 was set to 24 (atom %), the Cr content in the layer 5 was set to 2 (atom %), and the thickness of the layer 5 was set to 180 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

Comparative Example 14

A first recording layer 4 was formed on a first dielectric layer 3 through sputtering by using Gd, Fe, and Co in Ar atmosphere, in which the Gd content was set to 31 (atom %) and the thickness was set to 50 (Å).

A second recording layer 5 was formed on the first recording layer 4 through sputtering in Ar atmosphere by using Tb, Fe, Co, and Cr. In this case, the Tb content in the second recording layer 5 was set to 23 (atom %), the Cr content in the layer 5 was set to 1.5 (atom %), and the thickness of the layer 5 was set to 250 (Å).

Moreover, a transparent substrate 2, a first dielectric layer 3, a second dielectric layer 6, a reflective layer 7, and a protective layer 8 were formed in the same manner as the case of the embodiment 15 and a magneto-optical recording medium was fabricated in accordance with the same film-forming sequence as the case of the embodiment 15.

C/N characteristics of the magneto-optical media of the embodiment 15 to embodiment 19 and comparative example 8 to comparative example 14 fabricated as described above were evaluated by using a magneto-optical-disk standard evaluation system.

The C/N characteristics were evaluated by measuring the initial C/N (dB) and then measuring the C/N (dB) after repetitive recording.

The repetitive recording was performed by $10^6$ times and then, the C/N (dB) was evaluated to evaluate the C/N characteristic after repetitive recording.

It is a purposed value for practical use to secure a C/N level of 49 dB or more in both the initial C/N (dB) and the C/N (dB) after repetitive recording and moreover, a deterioration level after repetitive recording kept at a value lower than 1 (dB) is set as a level preferable for practical use.

Measuring conditions are shown below.

| | |
|---|---|
| Laser wavelength: | 780 (nm) |
| Numerical aperture NA: | 0.45 |
| Laser power for recording: | 4.55 (mW) |
| Reproducing laser power: | 0.6 (mW) |
| Bias magnetic field: | 100 (Oe) |

The following Table 3 shows fabrication conditions of magneto-optical recording media and evaluation results of the above C/N characteristics.

TABLE 3

|  | Gd content in first recording layer (atom %) | Thickness of first recording layer (Å) | Thickness of second recording layer (Å) | Cr content in first recording layer (atom %) | Tb content in second recording layer (atom %) | Initial C/N [dB] | Repeated C/N [dB] |
|---|---|---|---|---|---|---|---|
| Embodiment 15 | 29 | 70 | 230 | 0 | 22.0 | 49.43 | 48.96 |
| Embodiment 16 | 29 | 50 | 250 | 0 | 22.0 | 50.06 | 49.78 |
| Embodiment 17 | 28 | 100 | 200 | 0 | 24.0 | 49.13 | 48.86 |
| Embodiment 18 | 30 | 50 | 250 | 0 | 22.0 | 50.32 | 50.10 |
| Embodiment 19 | 28 | 100 | 200 | 1 | 22.0 | 49.34 | 49.10 |
| Comparative example 8 | 27 | 120 | 180 | 0 | 24.5 | 49.24 | 48.15 |
| Comparative example 9 | 29 | 140 | 160 | 0 | 21.0 | 45.82 | 40.31 |
| Comparative example 10 | 31 | 50 | 250 | 0 | 22.0 | 49.97 | 48.02 |
| Comparative example 11 | 27 | 100 | 200 | 0 | 25.0 | 48.81 | 47.78 |
| Comparative example 12 | 30 | 20 | 280 | 0 | 22.0 | 48.90 | 47.61 |
| Comparative example 13 | 28 | 120 | 180 | 2 | 24.0 | 47.31 | 47.14 |
| Comparative example 14 | 31 | 50 | 250 | 1.5 | 23.0 | 48.14 | 46.92 |

As shown in [Table 3], in the case of magneto-optical recording media of the embodiment 15 to embodiment 19 in which a first recording layer 4 is made of Gd, Fe, and Co, particularly contains 28 to 30 (atom %) of Gd, and has a thickness ranging from 50 to 100 Å and a second recording layer 5 is made of at least Tb, Fe, and Co, contains 22 to 24 (atom %) of Tb, and has a thickness ranging from 180 to 250 Å, 49 (dB) or more is secured for both the initial C/N level and the C/N level after repetitive recording and deterioration of the C/N level after repetitive recording is lower than 1 (dB) compared to the case of the initial C/N level. Therefore, it is found that the magneto-optical recording media respectively have a level preferable for practical use.

In Table 3, though the magneto-optical recording medium of the embodiment 19 contains 1 (atom %) of Cr in the second recording layer 5, the deterioration degree of the C/N level after repetitive recording is further decreased compared to the case of the embodiment 15 to embodiment 18 which exclude Cr, so that it is found that a magneto-optical recording medium superior in durability is obtained by containing Cr.

In the case of the comparative example 8, the Gd content in the first recording layer 4 is set to 27 (atom %) lower than 28 (atom %) and the thickness of the layer 4 is set to 120 (Å) exceeding 100 (Å) and the Tb content in the second recording layer 5 is set to 24.5 (atom %) exceeding 24 (atom %). In this example, however, it is impossible to secure 49 (dB) necessary for practical use because the C/N level after repetitive recording is excessively deteriorated.

In the case of the comparative example 9, the thickness of the first recording layer 4 is set to 140 (Å) exceeding 100 (Å), and the thickness of the second recording layer 5 is set to 160 (Å) less than 180 (Å) and the Tb content in the layer 5 is set to 21 (atom %) lower than 22 (atom %). In this example, neither initial CN level nor C/N level after repetitive recording reaches 49 (dB) and the C/N level after repetitive recording is greatly deteriorated.

In the case of the comparative example 10, the Gd content in the first recording layer 4 is set to 31 (atom %) exceeding 30 (atom %). In this example, the C/N level after repetitive recording is greatly deteriorated and 49 (dB) necessary for practical use cannot be secured.

In the case of the comparative example 11, the Gd content in the first recording layer 4 is set to 27 (atom %) lower than 28 (atom %) and the Tb content in the second recording layer 5 is set to 25 (atom %) exceeding (atom %). In this example, however, neither initial C/N level nor C/N level after repetitive recording reaches 49 (dB) and therefore, the C/N level after repetitive recording is greatly deteriorated.

In the case of the comparative example 12, the thickness of the first recording layer 4 is set to 20 (Å) less than 50 (Å) and the thickness of the second recording layer 5 is set to 280 (Å) exceeding 250 (Å). In this example, neither initial C/N level nor C/N level after repetitive recording reaches 49 (dB) and therefore, the C/N level after repetitive recording is greatly deteriorated.

In the case of the comparative example 13, the thickness of the first recording layer 4 is set to 120 (Å) exceeding 100 (Å) and the Cr content in the second recording layer 5 is set to 2 (atom %). In this example, neither initial C/N level nor C/N level after repetitive recording reaches 49 (dB).

In the case of the comparative example 14, the Gd content in the first recording layer 4 is set to 31 (atom %) exceeding 30 (atom %) and the Cr content in the second recording layer 5 is set to 1.5 (atom %). In this example, however, neither initial C/N level nor C/N level after repetitive recording reaches 49 (dB) and therefore, the C/N level after repetitive recording is greatly deteriorated.

As the result of comparing evaluation results of the comparative example 13 and comparative example 14 with the evaluation result of the embodiment 19, it is found that the Cr content in the second recording layer 5 must be set to 1 (atom %) or less.

A magneto-optical recording medium of a fourth aspect of the present invention is a magneto-optical recording medium in which a first dielectric layer, a first recording layer, a second recording layer, a second dielectric layer, and a reflective layer are laminated in order on a transparent substrate. When assuming the thickness of the first dielectric layer as $d_1$ and the thickness of the reflective layer as $d_2$, the relation of $0.55 \leq (d_2/d_1) \leq 0.9$ is effectuated and the reflective layer is constituted of Al, Au, and Ti, in which 20 to 40 (wt %) of Au and 0.5 to 2.0 (wt %) of Ti are contained.

Then, a magneto-optical recording medium of the present invention is described below by using specific embodiments and comparative examples. However, the present invention is not restricted to the following examples. The substrate, dielectric, recording materials and so on are the same as those used for the first aspect of the present invention.

Embodiment 20

A magneto-optical recording medium having the structure shown in FIG. 2 was fabricated as described below.

As a transparent substrate 2, a discoid substrate having an outside diameter of 64 (mm) and a thickness of 1.2 (mm) was fabricated with polycarbonate resin.

Then, a silicon-nitride film was formed on the transparent substrate 2 at a thickness of 850 (Å) through sputtering in $Ar/N_2$ gas atmosphere by using Si as a target to form a first dielectric layer 3.

Then, a GdFeCo-alloy film was formed at a thickness of 70 (Å) through sputtering in Ar atmosphere to form a first recording layer 4.

Then, a TbFeCoCr-alloy film was formed at a thickness of 230 (Å) through sputtering in Ar atmosphere to form a second recording film 5.

Then, a silicon-nitride film was formed through sputtering in Ar/N2 gas atmosphere by using Si as a target to form a second dielectric layer 6.

Then, a metallic layer was formed on the second dielectric layer 6 through sputtering in Ar atmosphere by using an $Al_{68}Au_{30}Ti_{2.0}$ alloy as a target to form a reflective layer 7.

The above subscripts 68, 30, and 2.0 of metallic elements denote a composition ratio and shows wt % of elements.

That is, the reflective layer 7 contains 68 (wt %) of Al, 30 (wt %) of Au, and 2.0 (wt %) of Ti.

The reflective layer 7 was formed at a thickness of 468 (Å) so that the value of $(d_2/d_1)$ became 0.55 when assuming the thickness of the above first dielectric layer 3 as $d_1$ and the thickness of the reflective layer 7 as $d_2$.

Then, a protective layer 8 was formed on the reflective layer 7 by spin-coating the layer 7 with an ultraviolet-curing resin, applying ultraviolet radiation, and curing the resin to finally fabricate a purposed magneto-optical recording medium 7.

Embodiment 21

A first dielectric layer 3 was formed at a thickness of 850 (Å) and a reflective film 7 was formed at a thickness of 553 (Å) so that the value of $(d_2/d_1)$ became 0.65 when assuming the thickness of the layer 3 as $d_1$ and that of the layer 7 as $d_2$.

The reflective film 7 had a composition of $Al_{68}Au_{30}Ti_{2.0}$, that is, the film 7 contained 68 (wt %) of Al, 30 (wt %) of Au, and 2.0 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Embodiment 22

A first dielectric layer 3 was formed at a thickness of 800 (Å) and a reflective film 7 was formed at a thickness of 520 (Å) so that the value of $(d_2/d_1)$ became 0.65 when assuming the thickness of the first dielectric layer 3 as $d_1$ and that of the reflective layer 7 as $d_2$.

The reflective film 7 had a composition of $Al_{78.5}Au_{20}Ti_{1.5}$, that is, the film 7 contained 78.5 (wt %) of Al, 20 (wt %) of Au, and 1.5 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Embodiment 23

A first dielectric layer 3 was formed at a thickness of 800 (Å) and a reflective film 7 was formed at a thickness of 680 (Å) so that the value of $(d_2/d_1)$ became 0.85 when assuming the thickness of the first dielectric layer 3 as $d_1$ and that of the reflective layer 7 as $d_2$.

The reflective film 7 had a composition of $Al_{59.5}Au_{40}Ti_{0.5}$, that is, the film 7 contained 59.5 (wt %) of Al, 40 (wt %) of Au, and 0.5 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Embodiment 24

A first dielectric layer 3 was formed at a thickness of 800 (Å) and a reflective film 7 was formed at a thickness of 720 (Å) so that the value of $(d_2/d_1)$ became 0.9 when assuming the thickness of the first dielectric layer 3 as $d_1$ and that of the reflective layer 7 as $d_2$.

The reflective film 7 had a composition of $Al_{64.5}Au_{35}Ti_{0.5}$, that is, the film 7 contained 64.5 (wt %) of Al, 35 (wt %) of Au, and 0.5 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 15

A first dielectric layer 3 was formed at a thickness of 600 (Å) and a reflective film 7 was formed at a thickness of 360 (Å) so that the value of $(d_2/d_1)$ became 0.6 when assuming the thickness of the first dielectric layer 3 as $d_1$ and that of the reflective layer 7 as $d_2$.

The reflective film 7 had a composition of $Al_{54}Au_{45}Ti_1$, that is, the film 7 contained 54 (wt %) of Al, 45 (wt %) of Au, and 1 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 16

A first dielectric layer 3 was formed at a thickness of 1,050 (Å) and a reflective film 7 was formed at a thickness of 788 (Å) so that the value of $(d_2/d_1)$ became 0.75 when assuming the thickness of the first dielectric layer 3 as $d_1$ and that of the reflective layer 7 as $d_2$.

The reflective film 7 had a composition of $Al_{64.7}Au_{35}Ti_{0.3}$, that is, the film 7 contained 64.7 (wt %) of Al, 35 (wt %) of Au, and 0.3 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 17

A first dielectric layer 3 was formed at a thickness of 750 (Å) and a reflective film 7 was formed at a thickness of 300

(Å) so that the value of $(d_2/d_1)$ became 0.4 when assuming the thickness of the first dielectric layer 3 as $d_1$ and that of the reflective layer 7 as $d_2$.

The reflective film 7 had a composition of $Al_{69}Au_{30}Ti_1$, that is, the film 7 contained 69 (wt %) of Al, 30 (wt %) of Au, and 1 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 18

A first dielectric layer 3 was formed at a thickness of 800 (Å) and a reflective film 7 was formed at a thickness of 880 (Å) so that the value of $(d_2/d_1)$ became 1.1 when assuming the thickness of the first dielectric layer 3 as $d_1$ and that of the reflective layer 7 as $d_2$.

The reflective film 7 had a composition of $Al_{69}Au_{30}Ti_1$, that is, the film 7 contained 69 (wt %) of Al, 30 (wt %) of Au, and 1 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 19

A first dielectric layer 3 was formed at a thickness of 850 (Å) and a reflective film 7 was formed at a thickness of 468 (Å) so that the value of $(d_2/d_1)$ became 0.55 when assuming the thickness of the first dielectric layer 3 as $d_1$ and that of the reflective layer 7 as $d_2$.

The reflective film 7 had a composition of $Al_{98}Ti_2$, that is, the film 7 contained 98 (wt %) of Al and 2 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 20

A first dielectric layer 3 was formed at a thickness of 850 (Å) and a reflective film 7 was formed at a thickness of 468 (Å) so that the value of $(d_2/d_1)$ became 0.55 when assuming the thickness of the first dielectric layer 3 as $d_1$ and that of the reflective layer 7 as $d_2$.

The reflective film 7 had a composition of $Au_{100}$, that is, the film 7 contained 100 (wt %) of Au.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 21

A first dielectric layer 3 was formed at a thickness of 850 (Å) and a reflective film 7 was formed at a thickness of 468 (Å) so that the value of $(d_2/d_1)$ became 0.55 when assuming the thickness of the first dielectric layer 3 as $d_1$ and that of the reflective layer 7 as $d_2$.

The reflective film 7 had a composition of $Al_{89}Au_{10}Ti_1$, that is, the film 7 contained 89 (wt %) of Al, 10 (wt %) of Au, and 1 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 22

A first dielectric layer 3 was formed at a thickness of 850 (Å) and a reflective film 7 was formed at a thickness of 468 (Å) so that the value of $(d_2/d_1)$ became 0.55 when assuming the thickness of the first dielectric layer 3 as $d_1$ and that of the reflective layer 7 as $d_2$.

The reflective film 7 had a composition of $Al_{80}Au_{20}$, that is, the film 7 contained 80 (wt %) of Al and 20 (wt %) of Au.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Comparative Example 23

A first dielectric layer 3 was formed at a thickness of 850 (Å) and a reflective film 7 was formed at a thickness of 468 (Å) so that the value of $(d_2/d_1)$ became 0.55 when assuming the thickness of the first dielectric layer 3 as $d_1$ and that of the reflective layer 7 as $d_2$.

The reflective film 7 had a composition of $Al_{77.5}Au_{20}T_{i2.5}$, that is, the film 7 contained 77.5 (wt %) of Al, 20 (wt %) of Au, and 2.5 (wt %) of Ti.

Moreover, a transparent substrate 2, a first recording layer 4, a second recording layer 5, a second dielectric layer 6, and a protective layer 8 were formed in the same manner as the case of the embodiment 20 to fabricate a magneto-optical recording medium 10 in accordance with the same film-forming sequence as the case of the embodiment 20.

Power-margin characteristics of the magneto-optical recording media of the embodiment 20 to embodiment 24 and comparative example 15 to comparative example 23 was evaluated by using a magneto-optical-disk standard evaluation system.

The power-margin characteristics were evaluated by measuring the initial power margin and the power margin after repeatedly performing recording $10^6$ times.

It was a purposed value for practical use to secure a initial power margin of 70% or more and a deterioration level after repetitive recording in which deterioration of power margin was kept at lower than 1% was set as a practically preferable level.

Measuring conditions are shown below.

| | |
|---|---|
| Laser wavelength: | 780 (nm) |
| Numerical aperture NA: | 045 |
| Laser power for recording: | 2.5–80 (mW) |
| Reproducing laser power: | 0.6 (mW) |
| Bias magnetic field: | 100–300 (Oe) |

The following [Table 4] shows fabrication conditions and evaluation results of the magneto-optical recording media.

TABLE 4

| Magneto-optical disk | Thickness of first dielectric layer ($d_1$) (Å) | Ratio between thicknesses of reflective layer and first dielectric layer ($d_2/d_1$) | Thickness of reflective layer ($d_2$) (Å) | Reflective-layer composition | Initial-power-margin level (Initial Pw) (%) | Deterioration rate (%) of power margin (Pw) after repetition |
|---|---|---|---|---|---|---|
| Embodiment 20 | 850 | 0.55 | 468 | $AlAu_{30}Ti_2$ | 80 | 0.4 |
| Embodiment 21 | 850 | 0.65 | 553 | $AlAu_{30}Ti_2$ | 78 | 0.55 |
| Embodiment 22 | 800 | 0.65 | 520 | $AlAu_{20}Ti_{1.5}$ | 73 | 0.75 |
| Embodiment 23 | 800 | 0.85 | 680 | $AlAu_{40}Ti_{0.5}$ | 74 | 0.6 |
| Embodiment 24 | 800 | 0.9 | 720 | $AlAu_{35}Ti_{0.5}$ | 76 | 0.6 |
| Comparative example 15 | 600 | 0.6 | 360 | $AlAu_{45}Ti_1$ | 62 | 0.6 |
| Comparative example 16 | 1050 | 0.75 | 788 | $AlAu_{35}Ti_{0.3}$ | 72 | 1.6 |
| Comparative example 17 | 750 | 0.4 | 300 | $AlAu_{30}Ti_1$ | 57 | 0.8 |
| Comparative example 18 | 800 | 1.1 | 880 | $AlAu_{30}Ti_1$ | 43 | 1.0 |
| Comparative example 19 | 850 | 0.55 | 468 | $AlTi_2$ | 72 | 1.7 |
| Comparative example 20 | 850 | 0.55 | 468 | Au | 40 | 2.6 |
| Comparative example 21 | 850 | 0.55 | 468 | $AlAu_{10}Ti_1$ | 50 | 1.5 |
| Comparative example 22 | 850 | 0.55 | 468 | $AlAu_{20}$ | 74 | 1.4 |
| Comparative example 23 | 850 | 0.55 | 468 | $AlAu_{20}Ti_{2.5}$ | 66 | 0.8 |

As shown in [Table 4], in the case of the magneto-optical disks of the embodiment 20 to embodiment 24 of the present invention in which the relation of $0.54 \leq (d_2/d_1) \leq 0.9$ is effectuated when assuming the thickness of the first dielectric layer as $d_1$ and that of the reflective layer as $d_2$ and the reflective layer is constituted of Al, Au, and Ti and contains 20 to 40 (wt %) of Au and 0.5 to 2.0 (wt %) of Ti, it is found that a value of 70% or more can be secured for every initial power margin and deterioration of every power margin after repetitive recording is kept below 1%, a level preferable for practical use.

In the case of the magneto-optical disk of the comparative example 15, the Au content in the reflective layer 7 was set to 45 (wt %). In this example, however, a value of 70% or more could not be secured for the initial power margin.

In the case of the magneto-optical disk of the comparative example 16, the Ti content in the reflective layer 7 was set to 0.3 (wt %). In this example, however, the deterioration rate of the power margin after repetitive recording exceeded 1%.

In the case of the magneto-optical disk of the comparative example 17, ($d_2/d_1$) was set to 0.4 when assuming the thickness of the first dielectric layer as $d_1$ and that of the reflective layer as $d_2$. In this example, however, a value of 70% or more could not be secured for the initial power margin.

In the case of the magneto-optical disk of the comparative example 18, ($d_2/d_1$) was set to 1.1 when assuming the thickness of the first dielectric layer as $d_1$ and that of the reflective layer as $d_2$. In this example, however, a value of 70% or more could not be secured for the initial power margin and the deterioration rate of the power margin after repetitive recording became 1%.

In the case of the magneto-optical disk of the comparative example 19, Au was not contained in the reflective layer 7. In this example, however, the deterioration rate of the power margin after repetitive recording exceeded 1%.

In the case of the magneto-optical disk of the comparative example 20, the reflective layer 7 was fabricated by using only Au. In this example, a value of 70% or more could not secure for the initial power margin and the deterioration rate of the power margin after repetitive recording exceeded 1%.

In the case of the magneto-optical disk of the comparative example 21, the reflective layer 7 contained 10 (wt %) of Au. In this example, a value of 70% or more could not be secured for the initial power margin and the deterioration rate of the power margin after repetitive recording exceeded 1%.

In the case of the magneto-optical disk of the comparative example 22, the reflective layer 7 did not contain Ti. In this example, the deterioration rate of the power margin after repetitive recording exceeded 1%.

In the case of the magneto-optical disk of the comparative example 23, the reflective layer 7 contained 2.5 (wt %) of Ti. In this example, a value of 70% or more could not be secured for the initial power margin.

As described above, in the case of every magneto-optical recording medium of the present invention in which a first dielectric layer, a first recording layer, a second recording layer, a second dielectric layer, and a reflective layer are formed in order on a transparent substrate, the relation of $0.55 \leq (d_2/d_1) \leq 0.9$ is effectuated when assuming the thickness of the first dielectric layer as $d_1$ and that of the reflective layer as $d_2$, and the reflective layer is constituted of Al, Au and contains Ti, 20 to 40 (wt %) of Au and 0.5 to 2.0 (wt %) of Ti, it is possible to secure a value of 70% or more for every initial power margin and widen the power margin.

Moreover, it is possible to prevent an error rate from increasing, reduce influences of disturbances, and improve the quality of a reproduced signal.

Furthermore, by mainly using Al and additionally using Au and Ti for a reflective layer, it is possible to improve the durability, and the deterioration rate of a power margin is decreased and a high reliability and a high C/N characteristic are maintained even after many times of recording.

According to a magneto-optical recording medium of the present invention, by specifying relations of width of a groove W, depth of a groove D, angle between wall faces of a groove θ, diameter of a laser beam spot Ø, and wavelength λ of a laser beam in a vacuum state, as $0.470 \leq W/Ø \leq 0.610$, $0.120 \leq D/(λ/n) \leq 0.142$, and $0.200 \leq [\{D/(λ/n)\}/(W/Ø)] \leq 0.330$ and a groove-wall-face angle $θ = 150° \pm 10°$, it is possible to a large-enough defocus tolerance of a laser beam for recording or reproducing a signal, which is large enough even when the pitch between the recording tracks is set to 1.5 μm which is narrower than ever.

According to the present invention, an in-plane-directional refractive index is set to a value ranging from 140 to 25 (nm), a vertical-directional double-refractive index is set to a value in a range of 200 to 300 (nm), a first recording layer is made of Gd, Fe, and Co, containing 28 to 30 (at %) of Gd, and having a thickness of 50 to 100 Å, and a second recording layer is made of at least Tb, Fe, and Co, containing 22 to 24 (at %) of Tb, and having a thickness of 180 to 250 Å.

Moreover, the relation of $0.55 \leq (d_2/d_1) \leq 0.9$ is effectuated when assuming the thickness of a first dielectric layer as $d_1$ and that of a reflective layer as $d_2$, and the reflective layer is made of Al, Au, and Ti and contains 20 to 40 (wt %) of Au and 0.5 to 2.0 (wt %) of Ti.

As a result, it is possible to improve the jitter characteristic and thereby to also improve an error-rate margin, as well as to secure both an initial C/N level and a C/N level after repetition at a high level enough for practical use, and to provide a magnetic-field-modulation over-writable magneto-optical recording medium maintaining a C/N characteristic less deteriorated.

According to the present invention, because a first recording layer and a second recording layer are formed through sputtering, it is possible to improve a C/N characteristic by forming both a recording layer in which data can be recorded at a low magnetic field and a recording layer in which data is recorded also at a high magnetic field.

According to the present invention, it is possible to improve an error-rate margin and a C/N characteristic, reduce influences of disturbances, improve the quality of a signal read by irradiation with a laser beam, and it is possible to stably reproduce signals. Moreover, by optimizing thicknesses of first and second recording layers, it is possible to maintain a high stability avoiding deterioration of a signal even when performing repetitive recording.

According to the present invention, particularly by making a second recording layer contain 1 (at %) of Cr or less, it is possible to secure both an initial C/N level and a C/N level after repetitive recording at a high level enough for practical use and obtain a magneto-optical recording medium having a less characteristic deterioration and a high durability.

According to the present invention, the relation of $0.55 \leq (d_2/d_1) \leq 0.9$ is effectuated when assuming the thickness of a first dielectric layer as $d_1$ and that of a reflective layer as $d_2$ and the reflective layer is made of Al, Au, and Ti and contains 20 to 40 (wt %) of Au and 0.5 to 2.0 (wt %) of Ti. Therefore, it is possible to expand a power margin, prevent an error rate from increasing, reduce influences of disturbances, and improve the quality of a reproduced signal.

According to the present invention, by adding Au and Ti into a reflective layer as additional elements, it is possible to improve the durability and maintain a C/N characteristic at a less deterioration and a high stability even after many times of recording.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical recording medium in which a recording section constituted of at least a first dielectric layer, a first recording layer, a second recording layer, and a second dielectric layer is sequentially formed on a transparent substrate, and a reflective layer and a protective layer are formed on the recording section, wherein a groove is formed on the transparent substrate along a recording track, both sidewalls of the groove are respectively formed into an independent wobbling shape (to be formed into a zigzag shape; hereafter referred to as wobbling), the relation of $0.470 \leq W/\emptyset \leq 0.610$ is effectuated when assuming the width of the groove as W, the relation of $0.120 \leq D/(\lambda/n) \leq 0.142$ is effectuated when assuming the depth of the groove as D, and the angle θ formed between wall faces of the groove is kept at 150°±10°

(In the above expressions, Ø denotes the spot diameter of a laser beam to be irradiated, λ denotes the wavelength of a laser beam in a vacuum state, and n denotes the refractive index of a transparent substrate).

2. The optical recording medium according to claim 1, wherein the pitch between the recording tracks is set to approx. 1.5 (μm).

3. An optical recording medium in which a recording section constituted of at least a first dielectric layer, a first recording layer, a second recording layer, and a second dielectric layer is sequentially formed on a transparent substrate, and a reflective layer and a protective layer are formed on the recording section, wherein a groove is formed on the transparent substrate along a recording track, both sidewalls of the groove are respectively formed into an independent wobbling shape (to be formed into a zigzag shape; hereafter referred to as wobbling), and the following relation is effectuated when assuming the width of the groove as W and the depth of the groove as D $$0.200 \leq [\{D/(\lambda/n)\}/(W/\emptyset)] \leq 0.330$$

(In the above expression, Ø denotes the spot diameter of a laser beam to be irradiated, λ denotes the wavelength of a laser beam in a vacuum state, and n denotes the refractive index of a transparent substrate).

4. The optical recording medium according to claim 1 in which a recording section constituted of at least a first dielectric layer, a first recording layer, a second recording layer, and a second dielectric layer is sequentially formed on a transparent substrate, and a reflective layer and a protective layer are formed on the recording section, wherein a groove is formed on the transparent substrate along a recording track, and the following relation is effectuated when assuming the width of the groove as W and the depth of the groove as D $$0.200 \leq [\{D/(\lambda/n)\}/(W/\emptyset)] \leq 0.330$$

(In the above expression, Ø denotes the spot diameter of a laser beam to be irradiated, λ denotes the wavelength of a laser beam in a vacuum state, and n denotes the refractive index of a transparent substrate).

5. The optical recording medium according to claim 3, wherein the track pitch between the recording tracks is set to approx. 1.5 (μm).

6. The optical recording medium according to claim 1 in which a recording section constituted of at least a first dielectric layer, a first recording layer, a second recording layer, and a second dielectric layer is sequentially formed on a transparent substrate, and a reflective layer and a protective layer are formed on the recording section, wherein an in-plane-directional refractive index ranges between −40 (nm) and 25 (nm), and a vertical-directional double-refractive index ranges between 200 and 300 (nm).

7. The optical recording medium according to claim 3 in which a recording section constituted of at least a first dielectric layer, a first recording layer, a second recording layer, and a second dielectric layer is sequentially formed on a transparent substrate, and a reflective layer and a protective layer are formed on the recording section, wherein an in-plane-directional refractive index ranges between −40 (nm) and 25 (nm), and a vertical-directional double-refractive index ranges between 200 and 300 (nm).

8. The optical recording medium according to claim 1 in which a recording section constituted of at least a first dielectric layer, a first recording layer, a second recording layer, and a second dielectric layer is sequentially formed on a transparent substrate, and a reflective layer and a protective layer are formed on the recording section, wherein the first recording layer is made of Gd, Fe, and Co, contains 28 to 30 (at %) of the Gd, and has a thickness of 50 to 100 Å, and the second recording layer is made of at least Tb, Fe, and Co, contains 22 to 24 (at %) of Tb, and has a thickness of 180 to 250 Å.

9. The optical recording medium according to claim 1, wherein the second recording layer is made of Tb, Fe, Co, and Cr and contains 1 (at %) of Cr or less.

10. The optical recording medium according to claim 3 in which a recording section constituted of at least a first dielectric layer, a first recording layer, a second recording layer, and a second dielectric layer is sequentially formed on a transparent substrate, and a reflective layer and a protective layer are formed on the recording section, wherein the first recording layer is made of Gd, Fe, and Co, contains 28 to 30 (at %) of Gd, and has a thickness of 50 to 100 Å, and the second recording layer is made of at least Tb, Fe, and Co, contains 22 to 24 (at %) of the Tb, and has a thickness of 180 to 250 Å.

11. The optical recording medium according to claim 3, wherein the second recording layer is made of Tb, Fe, Co, and Cr and contains 1 (at %) of Cr or less.

12. The optical recording medium according to claim 1 in which a recording section constituted of at least a first dielectric layer, a first recording layer, a second recording layer, and a second dielectric layer is sequentially formed on a transparent substrate, and a reflective layer and a protective layer are formed on the recording section, wherein the relation of $0.55 \leq d_2/d_1 \leq 0.9$ is effectuated when assuming the thickness of the first dielectric layer as $d_1$ and the thickness of the reflective layer as $d_2$, and the reflective layer is made of Al, Au, and Ti and contains 20 to 40 (wt %) of Au and 0.5 to 2.0 (wt %) of Ti.

13. The optical recording medium according to claim 3 in which a recording section constituted of at least a first dielectric layer, a first recording layer, a second recording layer, and a second dielectric layer is sequentially formed on a transparent substrate, and a reflective layer and a protective layer are formed on the recording section, wherein the relation of $0.55 \leq d_2/d_1 \leq 0.9$ is effectuated when assuming the thickness of the first dielectric layer as $d_1$ and the thickness of the reflective layer as $d_2$, and the reflective layer is made of Al, Au, and Ti and contains 20 to 40 (wt %) of Au and 0.5 to 2.0 (wt %) of Ti.

* * * * *